United States Patent [19]
Jeffers

[11] Patent Number: 4,782,395
[45] Date of Patent: Nov. 1, 1988

[54] RECORDING OF IMAGES ON IMAGE SENSITIVE MATERIAL

[75] Inventor: Martin C. Jeffers, Playa del Rey, Calif.

[73] Assignee: Modern Electronic Diagnostics Company, Inglewood, Calif.

[21] Appl. No.: 40,187

[22] Filed: Apr. 16, 1987

[51] Int. Cl.⁴ .................... H04N 5/84; G03B 27/72
[52] U.S. Cl. ................................. 358/244; 355/20
[58] Field of Search .................. 346/110 R; 355/20; 358/244, 332, 345

[56] References Cited

U.S. PATENT DOCUMENTS

| | | | |
|---|---|---|---|
| 3,507,575 | 4/1970 | Soule et al. | 358/244 X |
| 4,025,183 | 5/1977 | Pundsack | 346/110 R |
| 4,191,962 | 3/1980 | Sramek | 358/244 X |
| 4,664,506 | 5/1987 | Seki et al. | 355/20 |

Primary Examiner—Robert L. Richardson
Attorney, Agent, or Firm—Robert J. Schaap

[57] ABSTRACT

An apparatus and a method for recording images from a source which generates or presents the image, such as a screen of a cathode ray tube, onto an image sensitive material. Apparatus and method of this type are highly effective in recording a display of medical instrumentation output. The apparatus and method utilize an automatic loading and unloading mechanism in which an unexposed image sensitive sheet material is automatically moved into a photographic exposure position at a film plane, exposure is made and the image sensitive sheet material is then automatically moved to a discharge position. A changing of image sizes and number of images to be exposed on the image sensitive material can be made under operator control. Sensory mechanisms operating in conjunction with a microprocessor determine whether an image sensitive material sheet is located at the film plane and whether the sheet is in a desired orientation for a specified number of images to be exposed on the sheet, or whether a proper sized sheet may be present.

40 Claims, 4 Drawing Sheets

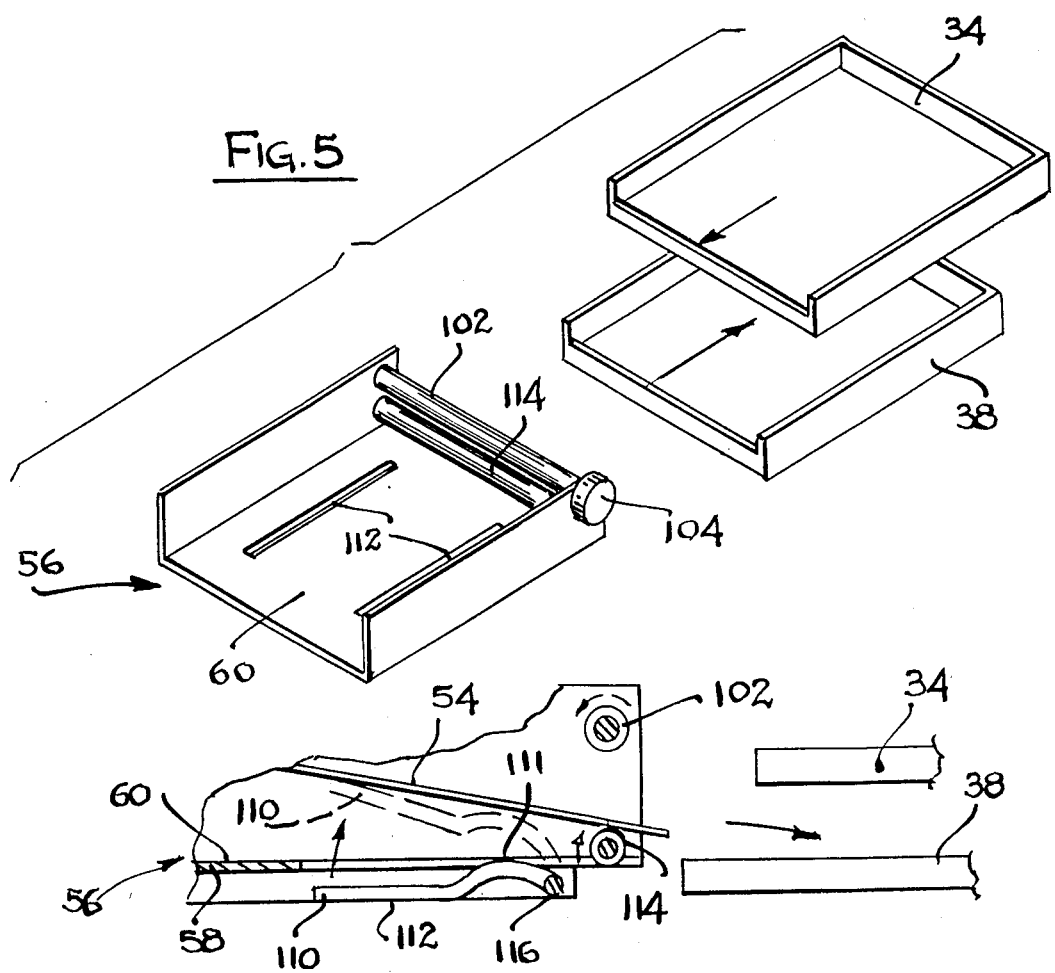
FIG. 5
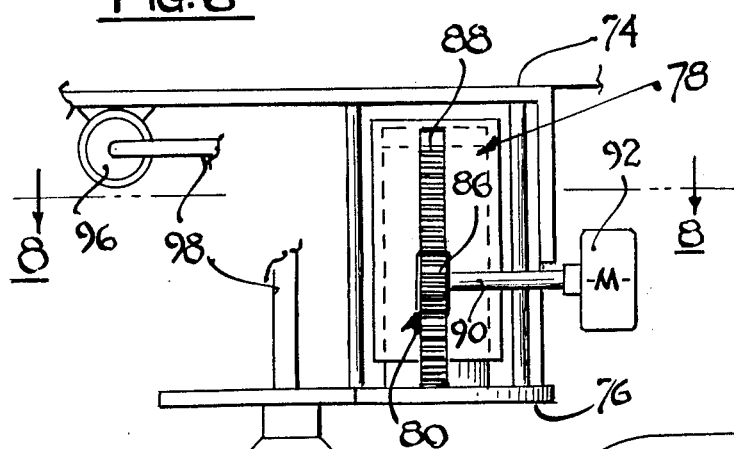
FIG. 6
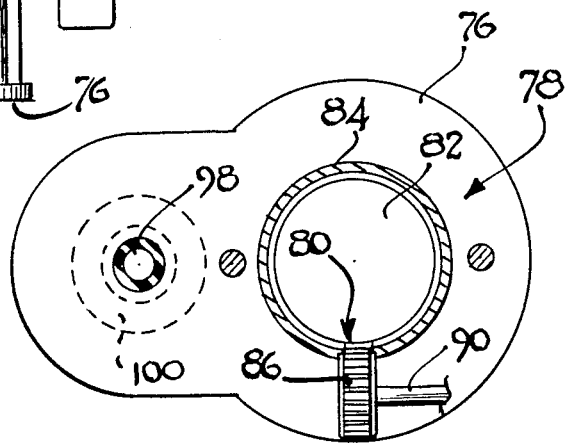
FIG. 7
FIG. 8

RECORDING OF IMAGES ON IMAGE SENSITIVE MATERIAL

BACKGROUND OF THE INVENTION

1. Field of the Invention

This invention relates in general to certain new and useful improvements in apparatus and method for recording images from a source onto image sensitive sheet material, and more particularly, to apparatus and method of the type stated which enables image recordation on photosensitive sheet material utilitizing automatic loading and unloading of the photosensitive sheet material.

2. Brief Description of the Prior Art

Recording of an image or series of images generated on a television screen or similar cathode ray tube, or other image generating source, onto an image sensitive material enables the making of a permanent record of that image. This permanent record also allows a further study or examination of that particular image or series of images which would not otherwise be available if one had to study the image or images in the particular time frame allowed by the screen of a cathode ray tube.

Apparatus of this type are highly effective in studying the images derived from medical instrumentation. This is particularly true where the images are not derived from electrically generated signals and therefore, not adapted for electronic storage in computer memories or the like. Furthermore, the recordation of television or similar images on to an image sensitive material enables permanent documentation in a form which is readily visible and accessible.

Many medical instrumentation processes as, for example, ultrasonic image generation, computed axial tomography, fluoroscopic analysis, electrocardiokymographic imaging, etc. all generate signals which are capable of being displayed on a cathode ray tube. Use of the television image recording apparatus to produce a hard copy which is readily visible and permanent enables examination of discrete processes which may be taking place and which would not be otherwise observable on a cathode ray tube.

There have been several television image recording apparatus and methods which are adapted to produce a photographic recording of an image on a cathode ray tube screen. Exemplary of this type of apparatus is U.S. Pat. No. 4,319,281 to Gall et al which teaches of a plurality of lens supports which are individually shiftable into and out of a plane in which image recording is to be conducted. An image from a television screen is projected onto a mirror and through the lenses of one of the individual lens supports, moved into a photographic position, and then onto an image sensitive material. By moving one of the individual lens supports out of the photographic position and moving another of the lens supports carrying different lenses into the photographic position, correct photographic distances are achieved relative to the lens, television monitor and the image sensitive material.

The Gall et al system is quite complex and requires invidual lens supports for shifting individual lenses. In view of the fact that the lenses are oftentimes high quality, high performance lenses, they can be quite expensive which generally increases the overall cost of the apparatus. Moreover, apparatus of this type require expensive lens support drives and the like.

U.S. Pat. No. 3,422,218 to Byer also discloses a television image recording apparatus which utilizes a vacuum printer disposed in relationship to a mirror and display tube. The photographic material is moved from a source onto a printing platen and a vacuum is applied to the platen during the image recording process. After exposure, the photographic material is then moved through a toner mechanism and subsequently into a fuser and developer station.

U.S. Pat. No. 3,276,312 to Florsheim, Jr. et al discloses a photographic apparatus utilizing a moveable vacuum plate. an image sensitive material is moved from a cassette into a position where it is engaged by the vacuum plate when a vacuum is applied to the vacuum plate. Thereafter, the vacuum plate is turned to a position where the sheet will receive an exposure to the image presented on a television camera. Thereafter, the reverse of this process takes place for returning the exposed image sensitive material to the cassette. The sheet material is moved without any contact with the emulsion. The Florsheim, Jr. et al Patent also discloses the use of a lens-mirror arrangement for projecting the image onto the image sensitive material.

U.S. Pat. No. 4,080,053 to Friday discloses a pneumatic suction device for holding a paper or film in a desired position in an image transfer system. Image transfer, in this case, involves the use of electrostatic image transfer mechanisms.

U.S. Pat. No. 3,608,452 to Conrad et al, and U.S. Pat. No. 3,673,936 to Stone, Jr. et al and U.S. Pat. No. 3,507,575 to Soule et al also disclose similar types of apparatus in which images can be recorded onto an image sensitive material.

In each of the prior art apparatus for recording television and similar cathode ray tube images, these apparatus were quite large and did not have the facilities of automatic film sheet movement by means of a relatively simple sheet movement mechanism which is small and compact. More specifically, these prior art apparatus did not include a mechanism for automatically loading a sheet from a source onto a film plane, and automatically removing the sheet from the film plane after exposure, without any significant contact with the image sensitive emulsion of the sheet. Moreover, these prior art image recording apparatus did not have the facility of detecting the presence of an unexposed film sheet in a photographic position and its proper orientation for a desired number of images to be recorded thereon, or whether a proper sized sheet was present.

OBJECTS OF THE INVENTION

It is, therefore, one of the primary objects of the present invention to provide an apparatus for recording an image from a source onto image sensitive material and which provides for automatic movement of an image sensitive sheet from a storage position into a photographic position and to a discharge position after exposure thereof.

It is another object of the present invention to provide an apparatus of the type stated in which a vacuum system is utilized for moving an image sensitive sheet material in such a manner that only relatively minimal contact occurs with the image sensitive emulsion of the sheet material.

It is also an object of the present invention to provide an apparatus of the type stated in which the appartus includes sensory means to determine if an image sensitive material is present in a photographic position and in a proper orientation, or whether a proper size of image sensitive sheet is in the photographic position.

It is an additional object of the present invention to provide an apparatus of the type stated which is capable of being constructed as a relatively small and compact unit and which is relatively light in weight but durable in construction and operation.

It is another salient object of the present invention to provide a method of recording an image from a source onto an image sensitive material with automatic loading of a sheet from a storage position into a photographic position and then automatically moving the sheet to a discharge position after exposure.

With the above and other objects in view, my invention resides in the novel features of form, construction, arrangement and combination of parts presently described and pointed out in the claims.

BRIEF SUMMARY OF THE DISCLOSURE

The present invention relates both to an apparatus and a method for recording images from a source which generates or presents an image onto an image sensitive material. The source of the image may adopt several forms, as hereinafter described. However, in a preferred embodiment, the apparatus more specifically comprises a cathode ray tube which may be connected to a closed circuit television system. In systems of this type, the cathode ray tube or receiver is connected to a video source in a closed loop system.

A lens or lens-mirror arrangement may be employed in the apparatus utilizing a cathode ray tube image source for purposes of directing an image generated on the screen to a film plane where an image sensitive material may be exposed to the image for the purpose of generating a permanent photographic record of the image on the screen.

The apparatus of the present invention includes an automatic sheet moving system. This sheet moving system is in the nature of a loading and unloading assembly for moving the image sensitive material from a light tight, transport container or bin, through the apparatus for purposes of exposure and then for delivery to a discharge. The loading and unloading assembly is actually comprised of a separate loading sub-assembly and a separate unloading sub-assembly.

The sheet material loading assembly generally comprises a tray or bin for receiving a supply of unexposed image sensitive sheets, which are typically stacked in the tray. A suction device is shiftable to a position where it may engage a sheet of the image sensitive material in the tray for each loading operation. The suction device will engage the unexposed sheet in the tray and when a vacuum is applied, the sheet will adhere to the suction device. This device is then moved with the sheet retentatively held by the vacuum imposed thereon, to a load drive roller, at which point the vacuum is released. The roller is rotated and will cause the movement of the sheet to a precise location at a film plane where it may be exposed.

After the image sensitive sheet has been located at the film plane and is in a proper position for exposure, an image from a source, such as a television screen, will be directed through a mirror and lens arrangement onto the sheet material to obtain an exposure thereof. The sheet material must be selected so that it is responsive to the image containing radiation. After completion of the exposure, the sheet unloading sub-assembly is employed and which includes one or more elongate elements, referred to as "ramps" which raise the sheet material above the film plane, thus allowing the sheet to slide down the ramps by force of gravity and over a discharge roller. The sheet of exposed image sensitive material is then disposed in contact with the discharge roller, or so-called "unload drive roller", which is driven, where the roller, in effect, enables transporting movement of the exposed sheet to a discharge area.

The discharge area of the apparatus may constitute a tray or bin to receive and retain the exposed sheet of image sensitive material. Otherwise, the discharge area could lead to an automatic film processor for automatically processing the exposed sheets of image sensitive material.

The apparatus can be properly programmed through operator control to expose the image sensitive material to a desired number of images, as for example, four images, six images, nine images, twelve images, fifteen images, etc. The images may be sequentially recorded thereon. The positioning of the sheet of material can be dependent upon the number of images which are to be exposed on the sheet of image sensitive material. In another embodiment, different sized sheets may be employed depending on the number of images to be recorded thereon.

The apparatus of the invention includes a sensory mechanism comprised of a plurality of sensors which are arranged to detect the presence of a sheet of material at the film plane. Moreover, the sensors are connected to a microprocessor forming part of the apparatus to interfere with the function of image recording if the sheet of material is not present. Moreover, the sensors are arranged to detect the orientation of the sheet of material and preclude exposure making if the sheet of material is not in a proper orientation for the desired number of images to be recorded on the sheet of image sensitive material, or otherwise, if a proper size of image sensitive sheet material is not present.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention, but is is to be understood that such detailed description is not to be taken in a limiting sense.

BRIEF DESCRIPTION OF THE DRAWINGS

Figure 1:
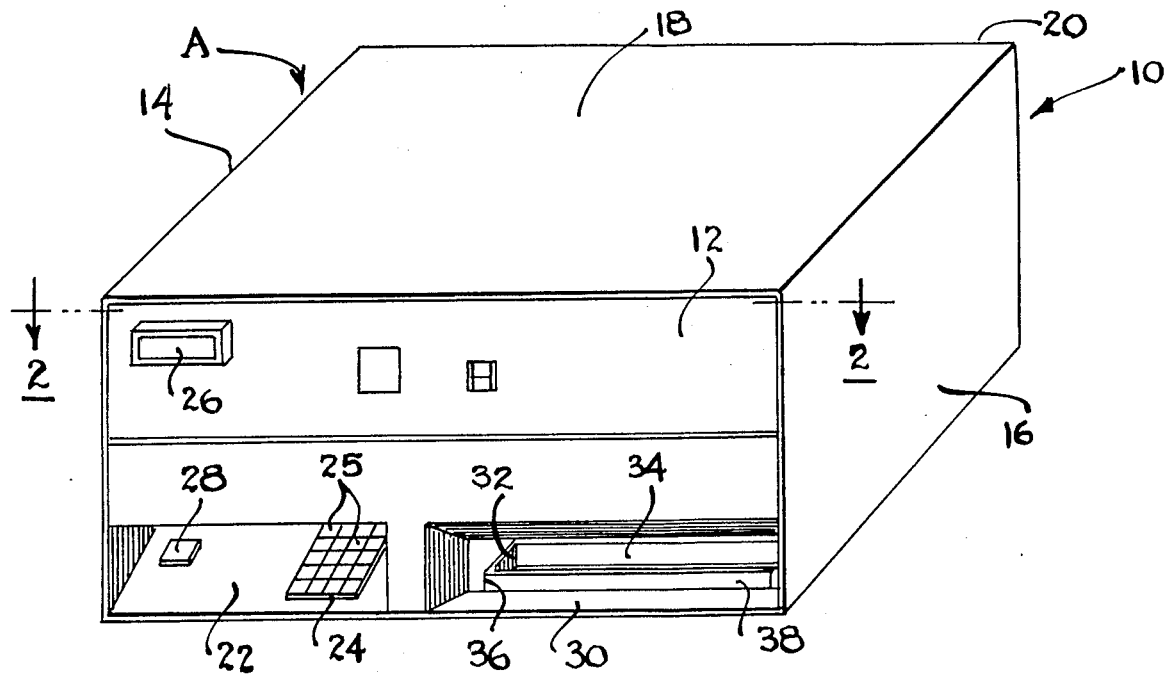
Figure 2:
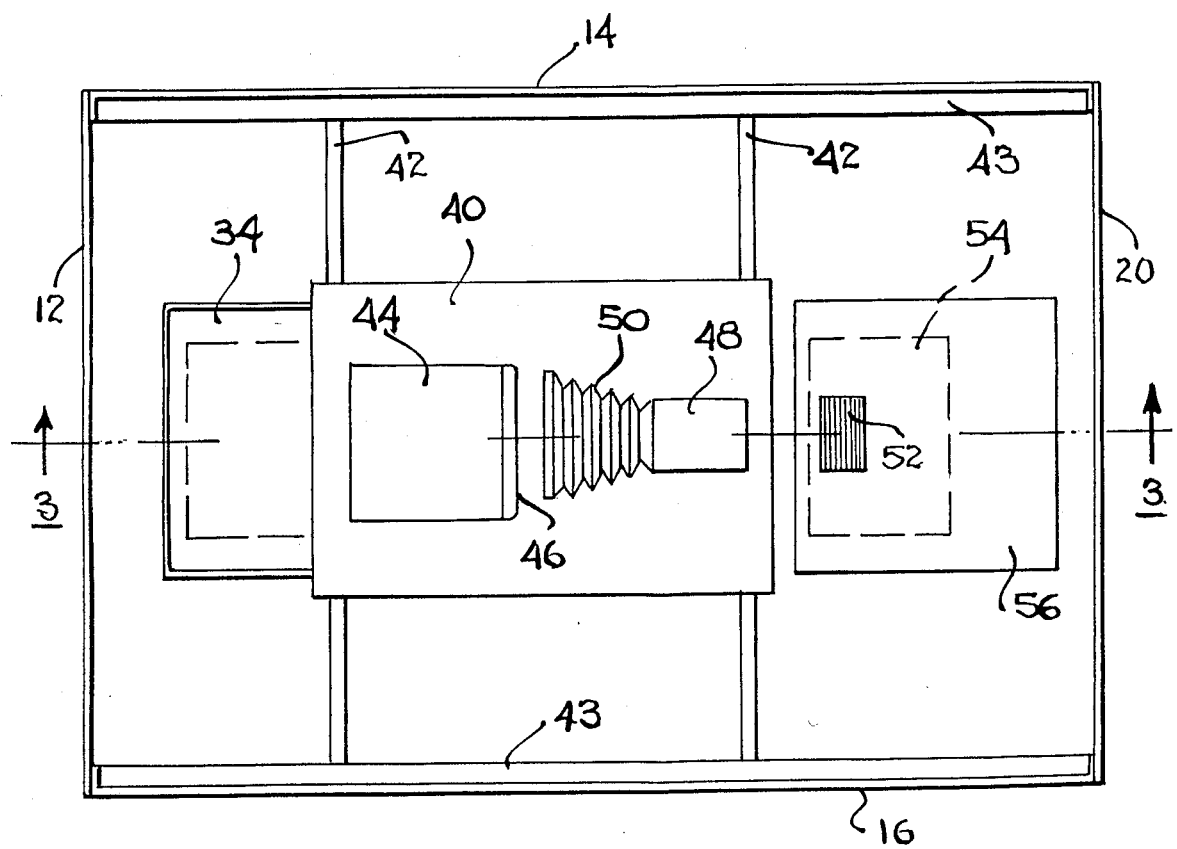
Figure 3:
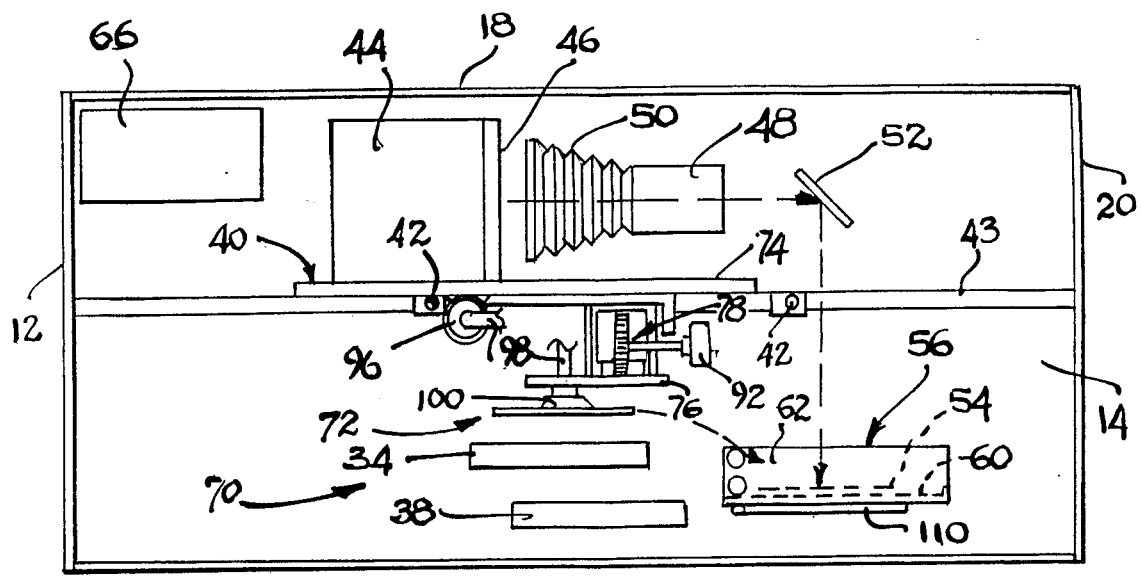
Figure 4:
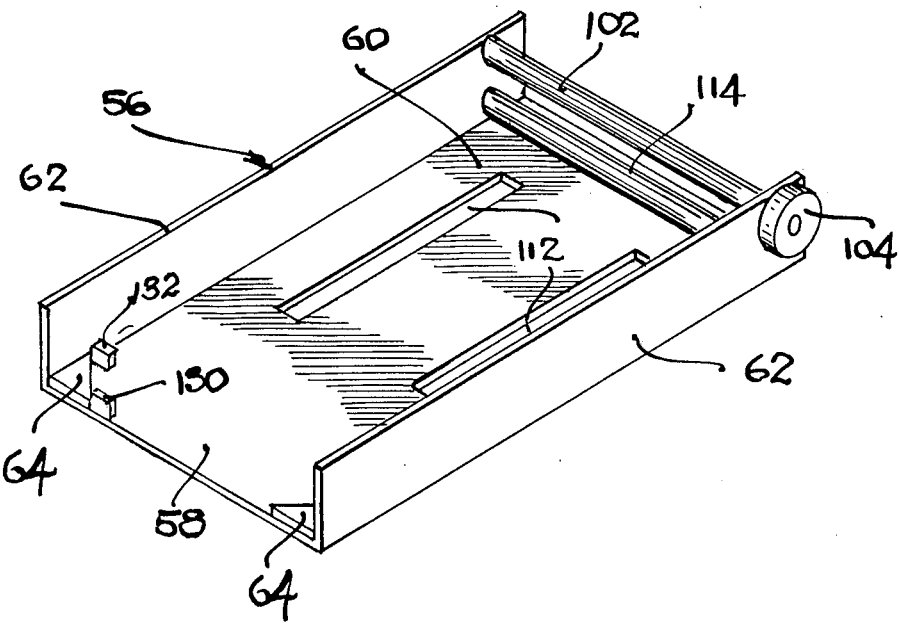
Figure 9:
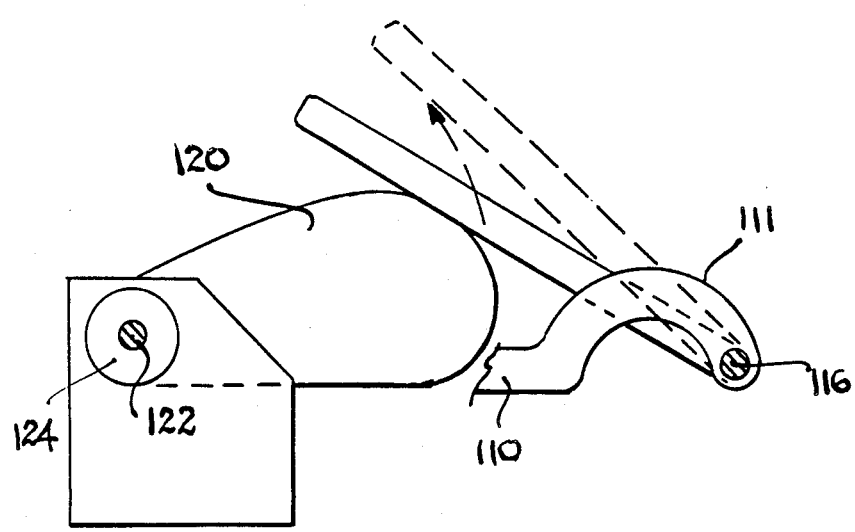
Figure 10:
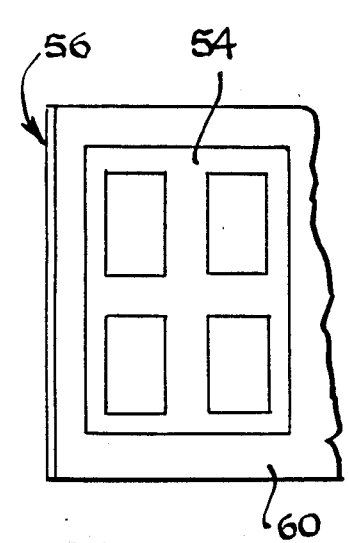
Figure 11:
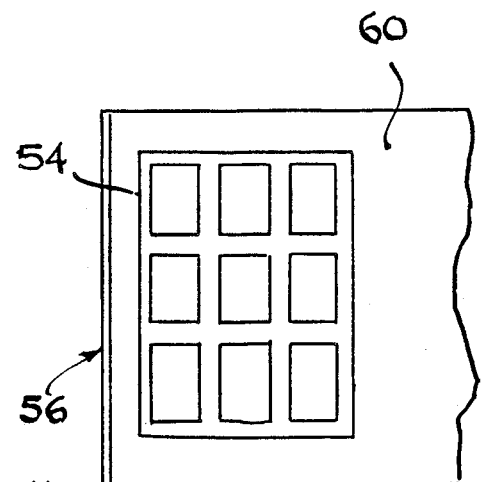
Figure 12:
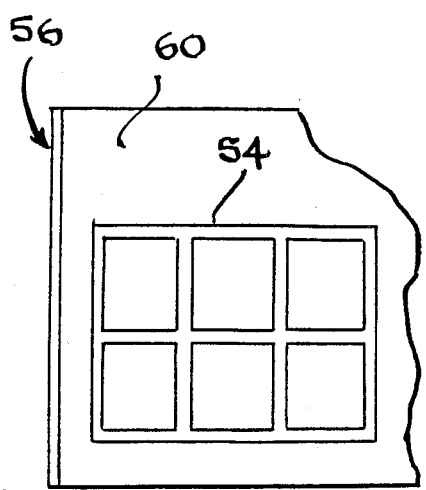
Figure 13:
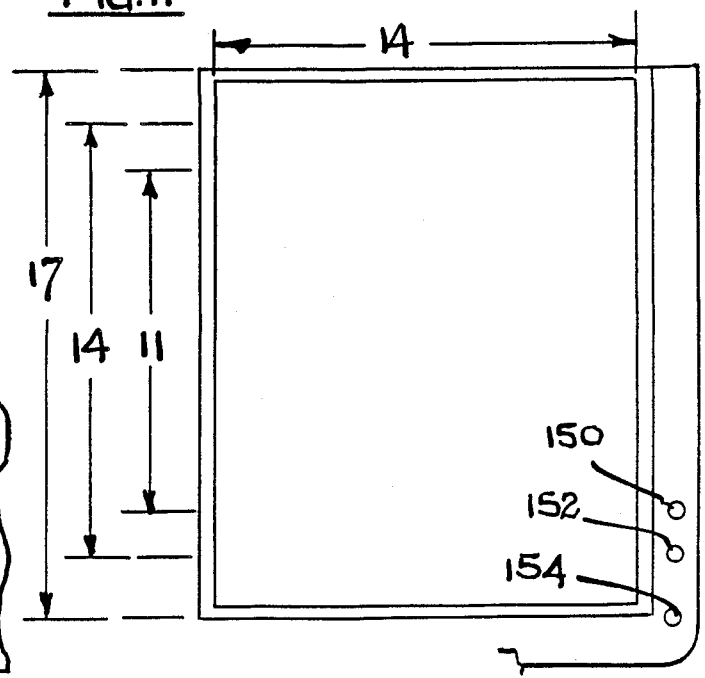

Having thus described the invention in general terms, reference will now be made to the accompanying drawings in which:

FIG. 1 is a perspective view of one embodiment of an image recording apparatus constructed in accordance with and embodying the present invention;

FIG. 2 is a top plan view of the apparatus with the upper casing thereof removed and taken substantially along line 2—2 of FIG. 1;

FIG. 3 is a vertical sectional view showing the interior portion of the apparatus of FIG. 1, and taken along line 3—3 of FIG. 1;

FIG. 4 is a perspective view of a sheet exposure tray forming a part of the apparatus constructed in accordance with and embodying the present invention;

FIG. 5 is an exploded perspective view showing a portion of the sheet loading and unloading assembly forming part of the apparatus of the present invention;

FIG. 6 is a schematic side elevational view showing the operation of the unloading sub-assembly forming part of the present invention;

FIG. 7 is a vertical sectional view showing a portion of a device for lowering and raising a sheet engaging member forming part of the loading sub-assembly of the present invention;

FIG. 8 is a horizontal sectional view taken along line 8—8 of FIG. 7;

FIG. 9 is a side fragmentary elevational view showing part of the sheet unloading sub-assembly;

FIG. 10 is a fragmentary schematic top plan view showing a first orientation of the sheet exposure tray in a position to have four exposures made thereon;

FIG. 11 is a fragmentary schematic top plan, view similar to FIG. 10, and showing the sheet of image sensitive material in a position to have nine exposures made thereon;

FIG. 12 is a fragmentary schematic top plan view, similar to FIGS. 10 and 11, and showing the sheet of image sensitive material in a position to have six exposures made thereon; and FIG. 13 is a schematic top plan view showing an exposure tray with a sensor arrangement to detect the presence of proper sized sheets in the tray depending on the number of images to be recorded thereon.

DETAILED DESCRIPTION OF A PREFERRED EMBODIMENT

Referring now in more detail and by reference characters to the drawings, which illustrate a preferred embodiment of the present invention, A designates an image recording apparatus comprising an outer housing 10, in the manner as illustrated in FIGS. 1-3 of the drawings. The housing 10 is comprised of a front wall 12 and a pair of opposed side walls 14 and 16 connected by a top wall 18 and a rear wall 20. The front wall 12 is also provided with a somewhat forwardly inclined control panel 22.

Located on the control panel 22 is a manually actuable pushbutton switch pad 24 containing manually actuable switches 25 for introducing information into a microprocessor in the apparatus, as hereinafter described. The control panel 22 also includes a display screen 26 for presenting information in display form about the data which may have been introduced through the manually actuable switchs 26 or about certain functions which may be taking place in the apparatus A. Finally, the control panel 22 includes a manually actuable start and stop switch 28 for purposes of initiating functions or stopping functions which may occur in the apparatus of the present invention.

The front wall 12 also includes a recessed area 30 having a first slot 32 for receiving a supply tray or bin 34 containing sheets of an image sensitive material. The recessed area 30 also includes a second slot 36 for receiving a discharge tray 38, which is located to receive the exposed image sensitive materials.

The major components of the apparatus A are more fully illustrated in FIGS. 2-9 and generally, comprise a component supporting carriage 40 which is transversely moveable on a frame 42. The frame 42 is, in turn, logitudinally moveable along a pair of laterally spaced horizontally extending rails 43 mounted on the interior surfaces of each of the side walls 14 and 16. Thus, it can be observed that the carriage 40 is capable of being shifted longitudinally and transversely within the housing 10, simultaneously and independently, in the manner as illustrated in FIGS. 2 and 3 of the drawings. The exact mechanism for mounting the carriage 40 on the frame 42 and the frame 42 on the rails 43 is conventional and is therefore neither illustrated nor described in any further detail herein.

In a preferred embodiment of the apparatus, cathode ray tube iamging is employed. Thus, in a preferred embodiment, a cathode ray tube or television unit is mounted on the carriage 40 for movement therewith and which cathode ray tube unit 44, has a forwardly presented screen 46 for generating a visual image thereon. This cathode ray tube unit 44, in this present embodiment of the invention, could adopt any form of conventional cathode ray tube system of the type capable of generating a visual image which can be recorded on a photosensitive sheet.

Any image generating or presenting source may be used in accordance with the present invention. For example, the image source could be a back lighted film transparancy. In another important embodiment, the image generating means may adopt a laser source which generates a laser image for recording on a laser sensitive sheet material. Thus, the source may be adopted to generate a visible image, or one which will be rendered visible, when exposed on a proper image sensitive sheet material. It is important for the sheet material to be sensitive to the particular radiation source, that is, the sheet material must be image sensitive.

For purposes of illustrating and describing the apparatus of the present invention, the apparatus will be described with a cathode ray tube or television unit for generating a visual image. The cathode ray tube unit or so called "monitor" 44 may be connected in a closed loop system to a video source for closed network image generation. In this respect, video signals (not shown) would be electrical signals representative of the image and transmitted to the unit 44 for generation of an image on the screen 46. This type of system is also conventional and is therefore neither illustrated nor described in any further detail herein.

The image from the screen 46 is projected through a lens 48, mounted on a bellows device 50, onto a mirror 52, in the manner as illustrated in FIGS. 2 and 3. The mirror 52 is positioned at an angle of about 45 degrees with respect to the vertically disposed face of the screen 46 and with respect to the horizontal axis of the lens 48. It should be understood that the lens 48 could be located in the optical path after the mirror 52. Thus, in this latter arrangement, the lens could be located such that its central axis is vertically disposed and receives the light beams reflected from the 45 degree angle positioned mirror 52. The latter arrangement would be preferred where it is necessary to reduce the length of the optical path, as for example, for smaller sized images.

The image is projected from the screen 46 of the monitor 44 and then through the lens 48 and reflected from the mirror 52, as aforesaid. The image is directed to a film sheet 54 having an image sensitive surface thereon and which film sheet 54 is disposed in an exposure tray 56. The exposure tray 56 is more fully illustrated in FIGS. 4, 5 and 6 of the drawings. However, FIGS. 4, 5, and 6 have been reversed in orientation (rotated about 180 degrees) with respect to FIGS. 1, 2, and 3, for purposes of clarity and to more fully illustrate the sequence of operations.

The exposure tray 56 generally comprises a flat sheet receiving bottom plate 58, having an upper surface 60 which constitutes a film plane. The tray 56 is also comprised of a pair of vertically disposed side walls 62 at each of the opposite longitudinal edges of the bottom wall 58. Moreover, it can be observed that whenever a sheet of image sensitive material 54 is loaded into the tray 56 it will always be located at the film plane 60. A pair of stops 64, in the nature of upstanding abutments, are also located at one end of the bottom wall 58, in the manner as illustrated in FIG. 4, to engage the sheet of image sensitive material and properly position the same at the film plane 60, in a manner to be hereinafter described in more detail.

The vertical elevation of the film plane 60 in the apparatus, always remains the same, although the mirror 52 can be shifted with respect to the film plane 60 in order to control image size and in order to control the focus of the image thereon. The carriage 40 is horizontally moveable and also, the lens 48 is moveable in a horizontal direction with respect to the mirror 52. In this way, it is possible to adjust the overall distance between the monitor screen 46 and the film plane 60. Moreover, the lens 48 may be separately driven from the carriage 40 so that the lens may be shifted horizontally with respect to the carriage 40.

Movement of the mirror 52 and/or movement of the monitor 44 and lens 48 in a horizontal plane may occur under control of a microprocessor 66 and which may receive input signals from the manually operable keyboard 24. In this way, the operator may introduce commands for control of the focus and control of the image size which will be processed by the microprocessor 66 and thereby, automatically adjust the position of the mirror 52 and/or the position of the lens 48.

The apparatus of the present invention also includes a loading and unloading assembly 70 for loading image sensitive materials 54 into the tray 56 at the film plane 60 and removing the sheets therefrom after exposure. The loading and unloading assembly 70 actually comprises a loading sub-assembly as well as an unloading sub-assembly and which operate in conjunction with one another under the control of the microprocessor 66. In this way, a sheet can be automatically loaded at the film plane, exposed and automatically removed therefrom completely under commands from the microprocessor 66 which is operable under the control of an operator of the apparatus A. Moreover, the sheet exposure tray 56 actually forms part of the loading and unloading assembly 70 in a manner to be hereinafter described in more detail.

The loading and unloading assembly 70 is more fully illustrated in FIG. 4-9 of the drawings and generally comprises the supply tray 34 containing a stack of marginally registered image sensitive materials, such as the sheet 54. Located almost immediately beneath the supply tray 34 is the receiving tray 38 for receiving the image sensitive materials 54 after exposure thereof.

A sheet engaging mechanism 72 is horizontally moveable with the carriage 40 and includes a suction device, as hereinafter described, which is shiftable with and with respect to the carriage 40. By further reference to FIGS. 2 and 3, it can be observed that the carriage 40 is shiftable on the frame 42 along the rails 43 in a horizontal direction from a position over the sheet supply tray 34 to a position in proximity to the sheet exposure tray 38.

The sheet engaging mechanism comprises a frame 74 mounted on the underside of the carriage 40 and which carries a vertically shiftable plate 76, in the manner as illustrated in FIGS. 7 and 8 of the drawings. The plate 76 is vertically shiftable through a piston-cylinder assembly 78 and which is actuable by a rack-and-pinion arrangement 80. In this respect, a piston 82 is shiftable within a cylinder 84 and forms part of the assembly 78. Moreover, the piston 82 is vertically shiftable by means of a pinion gear 86 disposed in meshing engagement with a rack 88 on the outer surface of the piston 82. The pinion gear 86 is mounted on a drive shaft 90 connected to a suitable electric motor 92 and which is, in turn, operable under the control of the microprocessor.

Mounted on the underside of the plate 76 is a suction cup 100 connected through a pressure hose 98 to a suitable source of a vacuum, such as a vacuum pump 96. Thus, and in accordance with the above identified construction, it can be observed that when the motor 92 is energized, it will cause a lowering of the plate 76 and hence the suction cup 100. Energization of the motor 92 in the opposite direction will cause a raising of the plate 76 and hence a raising of the suction cup 100.

When it is desired to load an image sensitive material 54 at the film plane 60, the film loading and unloading mechanism 70 is operated under the control of the microprocessor 66. In this way, the microprocessor 66 will cause the energization of the motor 92 to lower the piston 82. This will bring the rubber suction cup 100 into engagement with the uppermost sheet in the supply tray 34. Simultaneously therewith, a vacuum will be imposed in the suction cup 100. This will cause the suction cup 100 to maintain a vacuum between the uppermost sheet and the cup 100 and thereby enable the lifting of the uppermost sheet. At this point, the microprocessor 66 will cause horizontal movement of the carriage 40 along the rails 43 until the carriage 40 reaches the sheet loading position, that is, its farthest position of movement away from the supply bin 34 (to the right) in the manner as illustrated in FIG. 3.

When the carriage 40 has been moved to the sheet loading position, the vacuum in the cup 100 will be immediately removed which will cause a sudden release of the sheet 54. When the sheet 54 is released from the cup 100, it will drop onto a load drive roller 102 which is rotated in a direction to move the sheet into the exposure tray 56, reference being made to FIGS. 3 and 6. When the sheet 54 is moved into the tray 56, it will become automatically deposited on the plate constituting the film plane 60. The upstanding stops 64 will control the limit of movement of the sheet 54. In this way, a sheet 54 will be properly located in a precise position with respect to the film plane 60 and also in a precise position with respect to the lens 48 and the mirror 52.

The load drive roller 102 is powered by means of an electric motor 104 through a drive train (not shown) in the manner as illustrated in FIG. 4. It can be observed that the sheet engaging mechanism 72 will deliver the sheet to the sheet loading position, that is, to a position where it is partially disposed over the load drive roller 102 and will permit the roller to drive the same to the right, reference being made to FIGS. 2 and 3, until the sheet is in a proper position at the film plane 60.

After the exposure has been made, the sheet may be unloaded by the sheet unloading sub-assembly which comprises a pair of ramps 110 which lie beneath the sheet receiving bottom plate 58. The ramps 110 will project upwardly through openings 112 in the plate 58 to engage and lift the exposed sheet 54. Each of the ramps have a raised somewhat inverted U-shaped portion 111. When the ramps 110 are raised, as shown in FIG. 6, the sheet will be in an inclined position where it will be allowed to slide by force of gravity to an unload drive roller 114. Thus, when the ramps 110 are raised, they will impart a potential energy to the sheet allowing movement to the unload drive roller 114. The inverted U-shaped portion 111 raises the leading edge of the sheet so that it will move into contact with the upper surface of the unload drive roller 114. By altering the geometric arrangement and particularly by changing the pivot point of the ramps, it is possible to use ramps having flat planar surfaces, that is, without the inverted U-shaped portions. The unload drive roller 114 is transversely arranged and assembled in the upstanding side walls 62 in the same manner as the load drive roller 102. The unload drive roller 114 is also powered by the electric motor 104.

By reference to FIGS. 5 and 6, it can be observed that the unload drive roller 114 is located in a position that it can easily receive the leading edge of the sheet 54 which is lifted from the plate 58. Moreover, the unload drive roller 114 is rotated in a direction, reference being made to FIGS. 2, 3, 5 and 6 to drive the exposed sheet 54 into a position over the sheet discharge tray 38 where the sheet will be allowed to settle in the tray 38.

The ramps 110 are mounted on a transversely extending shaft 116 which is journaled in the side walls 62 of the tray 56. Moreover, the shaft 116, and hence, the ramps 110, are operable by a means of a cam 120 which is concentrically mounted on a shaft 122 and driven by an electric motor 124, in the manner as illustrated in FIG. 9. Again, the timing of the rotation of the cam 120 and hence the movement of the ramps 110 is controlled relative to the loading of the sheet 54 at the film plane 60 and the exposure of the sheet 54 at the film plane 60 under control of the microprocessor 66.

The entire loading and unloading assembly is unique in that it assumes only a small amount of space in that it moves the unexposed sheet to the film plane and thereafter moves the sheet after exposure in a relatively short movement path. Thus, the entire apparatus can be constructed as a relatively compact unit. Moreover, the loading and unloading can be operated by a single assembly as described herein under the control of the microprocessor and which can be controlled in response to other operations which take place in the apparatus of the present invention. Moreover, in combination with automatic focusing and positioning of the lens-mirror arrangement with respect to the film plane, the apparatus is essentially fully automated and is also easily operable under the control of an operator.

As indicated previously, the apparatus of the present invention can be programmed so as to provide a desired number of images and hence, the required image size on a single sheet of image sensitive material. Thus, as a simple example, the apparatus may be properly programmed to place either fifteen images, twelve images, or six images on a single sheet of 14×17 inch image sensitive material.

The sheet of image sensitive material may be positioned in the tray in the manner as illustrated in FIG. 10 and 11, or the sheet may be positioned in the tray 56 in the manner as illustrated in FIG. 12. When in the position as illustrated in FIG. 10, either four exposures or nine exposures may be made on the sheet in the arrangement as shown. When the sheet is oriented in the position as shown in FIG. 12, six exposures may be made on a single sheet.

As indicated previously, inasmuch as the position of the mirror 52 and the lens 48 can be changed relative to the screen of the monitor 44, and hence, since the overall distance between the screen 46 and the film plane 60 can be altered, the apparatus is capable of properly focusing and recording the desired number of images on a single sheet. In this respect, the lens 48 is a collimated lens so that a sharply focused beam can be achieved for each exposure.

A pair of sensors 130 and 132 are located on the tray 56 adjacent the stops 54. These sensors are connected to the microprocessor 66 and adapted to sense first the presence of a image sensitive material 54, and secondly the orientation of a sheet 54. If the sheet is not present, or if the sheet 54 is not properly positioned with respect to the desired number of images to be exposed on the sheet, the microprocessor will generate an alarm signal to advise the operator of a potential malfunction.

In another embodiment of the present invention, the sheet exposure tray can be constructed to as to receive different sized image sensitive sheets. In this way, a selected number of exposures may be made on a sheet, depending upon the particular size of sheet which is employed in the tray. Thus, in this embodiment, the apparatus may be properly programmed to place either fifteen images, twelve images, or six images on a single sheet of 14×17 inch image sensitive material. Naturally, the apparatus could be programmed to provide a lesser or greater number of images with corresponding image size changes. Here again, the apparatus could also be adapted to utilize smaller or larger sheets of image sensitive material.

FIG. 13 more fully illustrates an exposure tray of the type which may be used in this embodiment of the apparatus. This exposure tray would be similar in construction to the previously described exposure tray 56, as illustrated herein. However, in this case, the exposure tray may receive a 14 inch by 11 inch sheet of image sensitive material or a sheet of 14 inch by 14 inch image sensitive material, or otherwise, a sheet of 14 inch by 17 inch image sensitive material.

In the embodiment of the invention in connection with FIG. 13, it can be observed that three individual sensors 150, 152 and 154 are employed. These sensors are arranged so as to detect the size of the sheet which may be in the exposure tray 56. For example, a sensor 150 detects sheet sizes of 11 by 14, a sensor 152 detects sheets sizes 14 by 14 and a sensor 154 detects sheet sizes of 14 by 17. The apparatus can be properly programmed so as to include the desired number of images on the different sized sheets.

The housing is easily openable and the trays 34 and 38 are easily accessible at the front of the housing 10 in the manner as shown in FIG. 1. Thus, the tray 34 can be easily removed for refilling the same with image sensitive materials and the tray 38 can be removed for purposes of removal of the exposed sheets to enable development thereof.

It should also be understood that the discharge tray 38 could also be replaced by a suitable assembly designed to automatically deliver the exposed sheets to a development apparatus. As a simple example, the tray 38 could be replaced merely by a chute which allows the exposed sheet material to be delivered to a development apparatus located immediately beneath the apparatus A of the present invention.

One of the unique advantages of the apparatus of the present invention is the fact that the sheet can be moved and exposed with a minimum of contact. For example, the only contact with the image sensitive surface before exposure is the suction cup. Inasmuch as there is only a minimal amount of surface area on the suction cup, there can be little or no imperfections created on the emulsion. In addition, since the suction cup is not placing any substantial positive pressure on the surface of the image sensitive sheet, dust particles or other foreign material cannot be forced into the emulsion. After exposure, there is no physical contact with the image sensitive surface of the sheet.

In accordance with the present invention, and as stated, it is possible to program a large number of individual image sizes to be recorded on a single sheet of material. Thus, the present embodiments of the apparatus can be arranged so as to have up to 15 exposures on a single sheet of 14×17 inch image sensitive material. Moreover, the apparatus is effective to preclude false exposure, that is attempted exposures when a sheet of image sensitive material is not present.

In the various prior art apparatus, if the operator was uncertain as to whether or not a sheet was loaded in a exposure position, it was necessary to open the apparatus and determine if a sheet was properly in an exposure position. This created the attendant risk of exposing the sheet to the source of ambient light. The apparatus of the present invention utilizes a sensor system which will interfere with or otherwise advise the operator that a sheet is not present if such be the case. Moreover, it will also advise the operator if the sheet is not properly oriented for the desired number of exposures which have been programmed into the microprocessor. Further, the sensor system is adapted to provide response action if a proper sized sheet is not at the film plane for a selected number of exposures thereon.

The use of horizontally moveable components, including for example, the transversely and longitudinally moveable carriage and the horizontally moveable lens arrangement, as well as the horizontal movement path of the sheet material leads to a more compact unit and simplified construction. The horizontally moveable components enable the housing, and hence, the entire apparatus, to be constructed with a size and shape capable of being located on a shelf or similar supporting surface. The prior art units were geernally all floor disposed self-standing units which required considerable space. As a simple example, the prior art units generally consumed about 32 cubic feet of space or more, whereas the apparatus of the present invention may be constructed with a volume of eight cubic feet or less.

The term "sheet" has been used in the present invention in a broad sense only to describe the operation of the apparatus. In a preferred embodiment, the apparatus is operable with individual cut sheets of image sensitive material. For a visual image, as for example, from a cathode ray tube screen, the sheet material is photosensitive. However, it should be understood that the apparatus is operable with image sensitive roll film material, cut film and sheet film and any other form of photosensitive material which is capable of being exposed and ultimately developed to make a permanent record of the images from the monitor 44. The sheet material must be sensitive to the particular image source. Thus, for example, when using a laser image source, the sheet material must be sensitive to laser generated images.

Thus, there has been illustrated and described a unique and novel device and method for making permanent recorded images from corresponding images from a source on a fully automated basis and which thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described by invention, what I desire to claim and secure by letters patent is:

1. An apparatus for making a photographic record of an image, said apparatus comprising:
   (a) a housing,
   (b) an image source within said housing for generating or presenting image containing radiation such that when permanently recorded will generate a visual image,
   (c) means within said housing to direct the image containing radiation to a film plane,
   (d) means to receive and position an image sensitive sheet at the film plane so that the sheet may be exposed to the image containing radiation,
   (e) sheet loading means for automatically loading an image sensitive material at the film plane to enable exposure of the sheet to image containing radiation from the image source,
   (f) sheet unloading means for automatically removing the image sensitive sheet after exposure and delivering the same to a discharge area of said apparatus, and
   (g) control means for automatic positioning of the image source relative to the film plane in response to input control signals.

2. The apparatus of claim 1 further characterized in that the image source is a cathode ray tube.

3. The apparatus of claim 1 further characterized in that the means to direct the image containing radition comprises:
   (a) a lens located with respect to a cathode ray tube to receive the image generated thereon,
   (b) a mirror positioned to reflect the visual image from the cathode ray tube, 4. The apparatus of claim 1 further characterized in that said control means is a microprocessor control means and that the control means is operable to enable control over the number of images exposed onto a single sheet.

5. The apparatus of claim 4 further characterized in that the control means is operable to enable control of the size of an image onto the sheet.

6. The apparatus of claim 5 further characterized in that said sheet can be positioned in said apparatus in a manner to receive the desired number and orientation of the images to be recorded on said sheet.

7. The apparatus of claim 6 further characterized in that sensor means is located to detect the presence of a sheet at the film plane and take responsive action if the sheet is not present.

8. The apparatus of claim 1 further characterized in that said sheet loading means is pneumatically operable to cause a suction to be imposed on said sheet of material for engaging and moving same.

9. The apparatus of claim 8 further characterized in that said sheet unloading means comprises at least one elongate element capable of raising said sheet after exposure and enabling movement of said sheet to a discharge area.

10. In an apparatus for providing a photographic record of an image from a source which generates the image and which has a film plane located with respect to the source of the image, an improved image sensitive sheet loading assembly comprising:
(a) a sheet engaging member capable of movement from a supply area of image sensitive sheets where the sheet engaging member engages an image sensitive sheets and movse the sheet to a region where the sheet is disengaged and allowed to move to the film plane,
(b) vacuum means associated with the sheet engaging member to create a vacuum at the sheet engaging member to cause engagement of the sheet and which enables disengagement of the sheet when the vacuum is released, and
(c) means at the film plane to engage and receive the sheet in a proper position for exposure to the image.

11. The improved loading assembly of claim 10 further characterized in that a roller is located at the region where the sheet is disengaged and which receives the sheet and allows movement of the sheet by at least force of gravity to the film plane.

12. The improved loading assembly of claim 10 further characterized in that said sheet engaging member is mounted on a carriage which is moveable in a first path where the sheet engaging member is lowered into engagement with a sheet and raised from the supply area, and is moved in a second path to the region where the sheet is disengaged.

13. The improved loading assembly of claim 10 further characterized in that means is provided to enable orientation of said sheet in selected positions to change the orientation of the images on the sheet.

14. The improved loading assembly of claim 12 further characterized in that a sensor means is provided to detect the presence of a sheet at the film plane and its proper position thereat, or whether the sheet is of a proper size.

15. The improved loading assembly of claim 10 further characterized in that the source of the image is a cathode ray tube.

16. In an apparatus for producing a photographic record of an image from a source which generates or presents the image and which has means for exposing an image sensitive material at a film plane, an improved sheet unloading assembly comprising:
(a) a plate which receives the image sensitive sheet at the film plane,
(b) at least one pivotal elongate element located beneath said sheet at the film plane and capable of being moved into engagement with the sheet,
(c) means to actuate said elongate element after exposure of the sheet to cause a lifting of a portion of the sheet and initiate a sliding movement of the sheet by force of gravity, and
(d) roller means located to receive the sheet and enable movement of the sheet to a discharge area, and which roller means supports said sheet during a portion of movement to the discharge area.

17. The improved sheet unloading assembly of claim 16 further characterized in that said roller means comprises a single roller not in contact with a sensitive emulsion of the sheet.

18. The improved sheet unloading assembly of claim 16 further characterized in that a plurality of spaced apart elongate elements are provided.

19. The improved sheet unloading assembly of claim 18 further characterized in that camming means is connected to said elongate elements to cause a lifting of said elongate elements upon initiation of an unloading cycle.

20. The improved sheet unloading assembly of claim 16 further characterized in that the image is a visual image and the source of the visual image is a cathode ray tube.

21. In an apparatus for providing a photographic record of an image from a source which generates or presents the image containing radiation and which has a film plane located with respect to the source of the image, an improved image sensitive sheet loading and unloading assembly comprising:
(a) a sheet engaging member capable of movement from a supply area of image sensitive sheets where the sheet engaging member engages an image sensitive sheets and moves the sheet to a point where the sheet is disengaged and allowed to move to the film plane,
(b) vacuum means associated with the sheet engaging member to create a vacuum at the sheet engaging member to cause engagement of the sheet and which enables disengagement of the sheet when the vacuum is released,
(c) means at the film plane to engage and receive the sheet in a proper position for exposure to the image,
(d) at least one pivotal elongate element located beneath said sheet at the film plane and capable of being moved into engagement with the sheet,
(e) means to actuate said elongate element after exposure of the sheet to cause a lifting of a portion of the sheet, and
(f) roller means located to receive the sheet and enable movement of the sheet to a discharge area, and which roller means supports said sheet during a portion of movement to the discharge area.

22. The improved image sensitive sheet loading and unloading assembly of claim 21 further characterized in that a roller is located at the region where the sheet is disengaged and which roller receives the sheet and allows movement of the sheet by at least by force of gravity to the film plane.

23. The improved image sensitive sheet loading and unloading assembly of claim 21 further characterized in that said sheet engaging member is mounted on a carriage which is moveable in a first path where the sheet engaging member is lowered into engagement with a sheet and raised from the supply area, and in a second path to the region where the sheet is disengaged.

24. The improved image sensitive sheet loading and unloading assembly of claim 21 further characterized in that a sensor means is provided to detect the presence of a sheet at the film plane and its proper position thereat or if the sheet is of proper size.

25. The improved image sensitive sheet loading and unloading assembly of claim 21 further characterized in that a plurality of spaced apart elongate elements are provided.

26. The improved image sensitive sheet loading and unloading assembly of claim 25 further characterized in that a camming means is connected to said elongate elements to cause a lifting of said elongate elements upon initiation of an unloading cycle.

27. The improved image sensitive sheet loading and unloading assembly of claim 21 further characterized in that the source of the image is a cathode ray tube.

28. An improved image recording apparatus for recording onto an image sensitive material an image from a source, said apparatus comprising:
   (a) a housing,
   (b) an image source within said housing for generating or presenting image containing radiation such that when recorded, the radiation will generate a visual image,
   (c) means within the housing to direct the radiation to a film plane,
   (d) a receiving element located to receive an image sensitive material at a film plane and in a position where the sheet can be exposed to the radiation projected from the source,
   (e) means for adjusting the position of the source with respect to the film plane and the image sensitive material,
   (f) sensor means for detecting whether or not an image sensitive material is positioned at the film plane, and
   (g) microprocessor means operatively connected to said sensor means to provide a responsive action if a sheet is not at the film plane or if the sheet is improperly positioned at the film plane or if an improper size of sheet is present at the film plane.

29. The improved image recording apparatus of claim 28 further characterized in that the source is a cathode ray tube for generating a visual image.

30. The improved image recording apparatus of claim 29 further characterized in that said apparatus comprises:
   (a) a lens located to receive an image generated on a cathode ray tube, and
   (b) a mirror positioned to reflect the visual image generated on the cathode ray tube.

31. The improved image recording apparatus of claim 28 further characterized in that said microprocessor means enables a selected number of exposures to be made on a particular sheet.

32. The improved image recording apparatus of claim 31 further characterized in that the microprocessor means is operable to enable control over the number of images epxosed onto a single sheet.

33. The improved image recording apparatus of claim 32 further characterized in that the microprocessor means is operable to enable control over the sizes of the images exposed onto the sheet and said sensor means will detect if the sheet is in the desired orientation or if a proper sized sheet is present for the selected number of images to be exposed onto the sheet.

34. An apparatus for making a photographic record of an image from a source, said apparatus comprising:
   (a) a housing,
   (b) an image source within said housing for generating or presenting image containing radiation such that when recorded, the radiation will generate a visual image,
   (c) means within the housing to direct the radiation to a film plane,
   (d) a sheet receiving means to receive and position an image sensitive sheet at a film plane so that the sheet may be exposed to the image containing radiation,
   (e) a sheet engaging member capable of movement from a supply area of image sensitive sheets where the sheet engaging member engages an image sensitive sheet and moves the sheet to a region where the sheet is disengaged and allowed to move to the sheet receiving means,
   (f) vacuum means associated with the sheet engaging member to create a vacuum at the sheet engaging member to cause engagement of the sheet and which enables disengagement of the sheet when the vacuum is released,
   (g) means at the sheet receiving means to engage and receive the sheet in a proper position for exposure to the image containing radiation,
   (h) at least one pivotal elongate element located beneath said sheet at the sheet receiving means and capable of being moved into engagement with the sheet,
   (i) means to actuate said elongate element after exposure of the sheet to cause a lifting of a portion of the sheet,
   (j) roller means located to receive the sheet and supporting said sheet while moving to a discharge area, and
   (k) control means for automatically adjusting the position of the source relative to the film plane in response to input control signals.

35. The apparatus of claim 34 further characterized in that said souce is a cathode ray tube and said apparatus comprises:
   (a) a lens located with respect to a cathode ray tube to receive the image generated thereat, and
   (b) a mirror positioned to reflect a visual image from the cathode ray tube.

36. The apparatus of claim 34 further characterized in that a load drive roller is located at the region where the sheet is disengaged and which receives the sheet and allows movement at least by force of gravity to the sheet receiving means.

37. The apparatus of claim 36 further characterized in that said sheet engaging member is mounted on a carriage which is moveable in a first path where the sheet engaging member is lowered into engagement with a sheet and raised from the supply area, and in a second path to the region where the sheet is disengaged.

38. A method of making a photographic record of an image which is not necessarily permanent, said method comprising:
   (a) automatically moving a sheet engaging member into engagement with an image sensitive material,
   (b) applying a vacuum to the member and causing it to physically adhere the sheet to the member,
   (c) moving the member to a selected position,
   (d) releasing the vacuum and allowing the sheet to move to a film plane,
   (e) generating image containing radiation from a source,
   (f) projecting the radiation to the sheet at the film plane, and
   (g) causing a raised movement of the sheet after exposure such that a portion of the sheet is lifted and allowed to move to a discharge area.

39. The method of claim 38 further characterized in that the method comprises depositing the sheet on a roller immediately after release of the vacuum to allow the sheet to move to the film plane.

40. The method of claim 39 further characterized in that said method comprises lifting a portion of the sheet after exposure to another roller and allowing the sheet to move at least by force of gravity to a discharge area.

* * * * *